June 2, 1931.  H. CASLER ET AL  1,808,287
VEHICLE WHEEL GAUGE
Filed Oct. 11, 1928

Inventors
HERMAN CASLER.
CHARLES P. GRIMES

By Percy H. Moore
Attorney

Patented June 2, 1931

1,808,287

UNITED STATES PATENT OFFICE

HERMAN CASLER, OF CANASTOTA, AND CHARLES P. GRIMES, OF SYRACUSE, NEW YORK

VEHICLE WHEEL GAUGE

Application filed October 11, 1928. Serial No. 311,887.

This invention relates to vehicle wheel gauges and more particularly to that type of devices adapted for use in testing the alinement of automobile wheels.

Heretofore it has been the practice to provide a movable element or plate adapted to be placed in the path of the automobile which when engaged by a wheel which is out of alinement will be caused to move to one side or the other by the scrubbing action of the wheel, such movement being indicated by an indicator operatively connected to the movable element. In practice we have found that when such a device is used in testing the alinement of the front wheels of an automobile equipped with rubber tires, that the indicator readings are erroneous and therefore most unsatisfactory. This objection arises from the fact that when the wheels of a vehicle are out of alinement and the vehicle is driven some little distance in approaching the device, the scrubbing action due to misalinement of the wheels, acts to distort the shape of the tires to such an extent that the tire is forced to slip over the floor or pavement. When a vehicle wheel, under the conditions just described, reaches and engages the movable element or plate, the latter is at once moved either to the right or to the left a distance sufficient to allow the tire on the wheel engaging the movable element to assume its normal shape. Further travel of the wheel over the movable element causes the latter to move an additional distance which represents the true movement of the movable member due to the mis-alinement of the wheel. This is especially true of vehicles equipped with balloon tires.

The principal object of our invention is to overcome the foregoing objection by providing an auxiliary movable member or plate which will permit the tire of the wheel being tested to assume its normal shape before reaching the main or misalignment indicating device.

Other objects and advantages of the invention will be apparent as the following description is considered in connection with the accompanying drawings in which we have illustrated an embodiment of the invention; and wherein.

Figure 1:
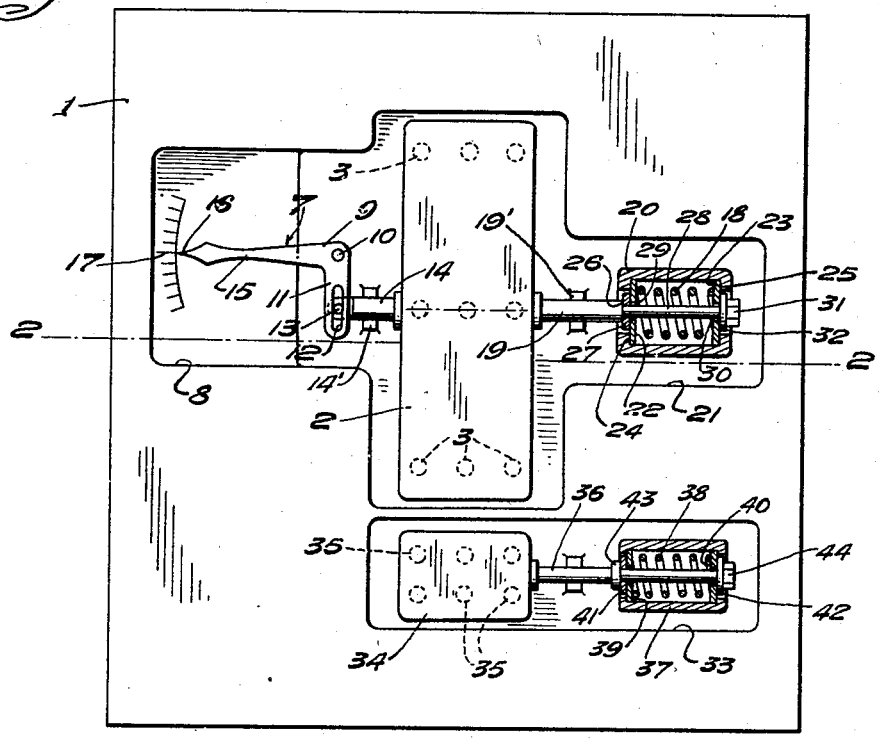
Figure 1 is a top plan view of the device embodying our invention.
Figure 2:
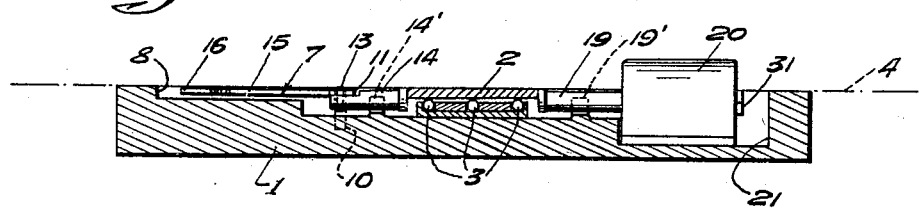
Figure 2 is a section on line 2—2 of Figure 1.
Figure 3:
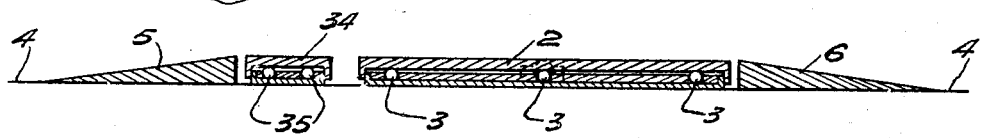
Figure 3 is a sectional view showing the device mounted on the garage floor and showing the use of ramps.

Referring more particularly to the drawings, wherein like reference numerals designate corresponding parts throughout the views, 1 denotes a base plate recessed to receive a movable member or platform 2 preferably provided on its under side with suitable antifriction means such as ball bearings 3, to facilitate reciprocation with respect to the base plate. This base plate is preferably sunk flush with the top of the floor 4 of the garage in which it is installed, but it may be placed on top of the floor, in which case inclined approaches 5 and 6 would be employed. The plate 1 is preferably made of cast iron but in some instances the plate may be dispensed with and the floor 4 provided with suitable recesses in which to mount the mechanism.

The movable platform or plate 2 is connected at one side with gauge or indicator 7 mounted in a lateral recess 8 of the base plate. This indicator comprises a bell crank 9 pivotally mounted on pin 10, one arm 11 of the bell crank being formed with a slot 12 adapted to receive a pin 13 on an arm 14 projecting from the platform 2 and the other arm 15 terminating in a pointer 16. A graduated scale 17 arranged in the path of the pointer 16, indicates the degree of movement of platform 2 when engaged by a mis-alined tire, as will be hereinafter described.

The platform 2 is maintained in its normal or mid-position by means of a coil spring 18 and connecting rod 19, the latter being connected to the side of the platform opposite to that connected to the gauge. The coil spring 18 is confined within a casing 20, mounted in the lateral recess 21, of the base plate, by means of washers 22 and 23 against which the ends of the spring bear, the washers in turn being held by the spring against shoulders 24 and 25 formed in opposite ends of the casing. The connecting rod 19 is formed with a shoulder 26 adjacent its inner end, against which a washer 27 seats, and the outer end of the rod which is reduced as at 28, extends loosely through the centrally disposed openings 29 and 30 in the respective washers 22 and 23. A nut 31 screwed on the outer end of the connecting rod holds a small washer 32 to the previously mentioned large washer 23. The large washer 22 at the inner end of the casing, also previously mentioned, bears against the small washer 27 in addition to being held against the shoulders 24.

A movable auxiliary recess or platform 34 is suitably mounted in plate 33 with freedom for limited reciprocatory movement to the right or left of the normal position illustrated in Figure 1. Ball bearings 35 are preferably provided although any anti-friction device may be employed. The auxiliary platform 34 has a connecting rod 36 which extends through a spring casing 37 in which a coil spring 38 is mounted and bears at its ends against large washers 39 and 40. Smaller washers 41 and 42 respectively engage the outer faces of the large washers and in turn are held in place by the shoulder 43 adjacent the inner end of the rod and a nut 44 on the outer end thereof. It will be noted that the auxiliary mechanism is substantially a duplication of the main tire testing mechanism with the gauge or indicator parts omitted.

Briefly stated the operation of the device is as follows:

Assuming that a misalined vehicle wheel is run over the auxiliary platform 34, the tire distortion built up during the travel of the tire across the garage floor will be relieved by the forced movement of the platform to the right or to the left against the tension of spring 38. It will be understood that the width of the plate 34 measured parallel to the travel of the vehicle is sufficient to provide support for the entire portion of the tire which is flattened out by the weight of the vehicle. As the distance between auxiliary plate 34 and plate 2 is negligible, continued movement of the vehicle will cause the tire to reach the testing plate or platform 2 free from accumulated distortion. Consequently when the wheel leaves plate 34 and passes over plate 2, the latter will move to the right or left only the true distance which it is caused to move due to the mis-alinement of the wheel minus any built up distortion.

Movement to the right or left of the plate or platform 2, against the tension of spring 18 which normally holds the platform in normal mid position, will cause the pointer 16 to move across the graduated scale 17 and thus indicate to the operator the exact condition of the wheel.

Having thus described our invention, what we claim is:

1. A rubber tire vehicle wheel alining device comprising a movable element adapted to be placed in the path of travel of the vehicle wheel and laterally shiftable with respect to said path when traversed by a misaligned wheel, an indicator, means for actuating said indicator upon the movement of said movable element to indicate mis-alinement of the wheel, and an auxiliary movable member positioned directly adjacent and in advance of said movable element adapted to eliminate tire distortion built up in approaching the device, whereby said indicator will indicate the true degree of said mis-alinement of said wheel to the path of travel of the same when said movable element is traversed by the wheel.

2. A rubber tire vehicle wheel alining device comprising a movable element adapted to be placed in the path of travel of the vehicle wheel and laterally shiftable with respect to said path, when traversed by a misaligned wheel, an indicator, means for actuating the indicator upon the movement of said movable element to indicate mis-alinement of the wheel with respect to the path of travel of the same when said movable element is traversed by the wheel, and an auxiliary movable member positioned directly adjacent and in advance of said movable element adapted to eliminate tire distortion built up during the travel of said wheel in approaching the device.

3. A vehicle wheel testing device comprising a movable element adapted to be placed in the path of travel of the vehicle wheel, and laterally shiftable to right or left of its normal mid-position with reference to said path by the action of a mis-alined vehicle wheel passing thereover, and an auxiliary movable member positioned directly adjacent and in advance of said movable element for preventing movement of said movable element due to tire distortion built up prior to engagement of the wheel with the movable member.

In testimony whereof we affix our signatures.

HERMAN CASLER.
CHARLES P. GRIMES.